United States Patent

Poulsen

[11] Patent Number: 5,881,889
[45] Date of Patent: Mar. 16, 1999

[54] SORTER SYSTEM OF THE GRADER TYPE

[75] Inventor: Søren Poulsen, Århus V, Denmark

[73] Assignee: Scanvaegt A/S, Århus N., Denmark

[21] Appl. No.: 817,173
[22] PCT Filed: Oct. 18, 1995
[86] PCT No.: PCT/DK95/00416
  § 371 Date: Apr. 21, 1997
  § 102(e) Date: Apr. 21, 1997
[87] PCT Pub. No.: WO96/12664
  PCT Pub. Date: May 2, 1996

[30] Foreign Application Priority Data

Oct. 20, 1994 [DK] Denmark .................................. 1215/94

[51] Int. Cl.⁶ ...................................................... B07C 9/00
[52] U.S. Cl. ...................................... 209/657; 198/370.02
[58] Field of Search ...................................... 209/655, 657, 209/656, 653; 198/360, 359, 364, 370.02

[56] References Cited

U.S. PATENT DOCUMENTS 3,661,255  5/1972  Toth ......................................... 209/655
4,732,260  3/1988  Canziani ................................. 198/365

*Primary Examiner*—Kenneth Noland
*Attorney, Agent, or Firm*—Sixbey, Friedman, Leedom & Ferguson; David S. Safran

[57] ABSTRACT

In sorter systems of the grader type a selective unloading or throwing out of conveyed objects is effected, from a conveyor (8) to selected receiver stations therealong. Each of these stations is equipped with a receiver bin (10) having a bottom outlet valve (22) and an upper mouthing, which, due to some spreading in the unloading function, should have a certain minimum size. In order to increase the capacity of such a system without prolonging the conveyor, the invention provides for the receiver stations to comprise more than one operative receiver bin or bin section each, which are currently switchable in a controlled manner. Preferably, use is made of a single, fixed container (10) separated in two sections with individual bottom valves, viz, separated by means of a pivot plate (18), which, with a maintained full size of the container mouthing, is pivotable against two opposed container walls for selectively guiding the received articles to the respective two sections, from which the collected article portions may be let out individually.

6 Claims, 1 Drawing Sheet

SORTER SYSTEM OF THE GRADER TYPE

BRIEF SUMMARY OF THE INVENTION

The present invention relates to a portioning apparatus of the grader type, i.e. an apparatus having an inlet for a flow of mutually separated objects, a station for detecting a relevant quality of the objects, preferably their weight, a control unit, a conveying line for further conveying the objects along a sorting out path with an associated series of receiver containers, diverter means for selectively unloading the objects, controlled by the control unit, for an accumulative building up of desired object portions in the receiver containers, actuation means controlled by the control unit for effecting outletting of finished portions from the receiver containers, and conveyor means located underneath the containers for currently receiving and delivering the finished portions.

This type of apparatus is used primarily in the food industry, for the handling of fresh or frozen pieces of foodstuff to be merged into portions according to predetermined criteria, e.g. for achieving a fixed portion weight with a higher or lower tolerance, despite the objects exhibiting a marked weight distribution.

Thus, what is actual is the handling of unwrapped objects, which can be anticipated to be more or less sticky or as far as the frozen objects are concerned more or less fragile, and the apparatus, of course, should be adapted correspondingly.

Preferably, the said conveying path is constituted by a suitable conveyor belt, while the diverter means are made as diverter wings which may be selectively swung-in over the belt at the relevant places and moments of time for guiding or even throwing out the objects to the respective receiving or portioning containers, whereafter they are immediately swung out again for enabling a free passage of following objects to succeeding containers.

The receiving or portioning containers should be designed such that they are suitable for reception of both sticky and semi-fragile objects, i.e. with steep walls for avoiding adherence of a received object to a wall portion rather than the object reaching the outlet bottom of the container, and with a relatively low building height for preventing fragile objects from reaching the bottom with such a high speed of falling that objects could incidentally break. A low building height, of course, will be desirable also for other reasons, e.g. because underneath the containers space should be provided for the outlet conveyor to receive the finished portions from the containers.

When a desirably high working speed is used, even with optional throw-out action, the unloading will be connected with a certain spread in the delivery positions of the articles at the single containers, i.e. these should have a mouthing of a certain oversize relative to the size of the articles. Seen in the transverse direction of the conveyor belt this is no special problem, but in the longitudinal direction it results in the conveyor having to be built with a kind of overlength, implying extra costs and space requirements.

The invention has for its purpose to provide an apparatus of the type specified, by which the said conveyor may be built with reduced length for a given number of receiver containers.

With the invention is it realised that in this respect there is not much to gain by a reduction of the distance between the receiver containers along the conveyor, as the containers may already be located quite close to each other, and it is even renounced to reduce the length dimension of the containers in the length direction of the conveyor, inasfar as the said spread in the delivery positions of the articles is accepted. However, in connection with the invention it has been recognised that it is advantageously possible to make use of a special cross distribution principle previously suggested in a deviating concept, viz. in connection with a postal sorting system for envelopes and small parcels according to U.S. Pat. No. 4,732,260, where use is made of a controlled system for a selective distribution of objects received in each single receiver station to a plurality of receiver containers therein, viz. in the form of postal bags arranged in a row crosswise of the moving direction of the sorter conveyor. Thus, in the space occupied by the individual receiver stations there may be more than a single receiver container, and already if there are two containers in each station this will imply that the length of the conveyor may be halved, which will be a significant result. The said known system is based on the idea of providing above the said postal bags a distributor system, which can receive the articles from the sorter conveyor and distribute them to the different receiver bags. Basically, this will not be compatible with the discussed requirements as to steep sides and low falling-height, but according to the invention it is possible to use a modified principle, based on the individual containers themselves or their upper mouthings being selectively positionable in a receiver position laterally of the sorter conveyor. Thus, the articles may then be delivered directly to the containers without having to pass a separate distributor system, and it is possible to thereby achieve an operational delivery of the sticky or frozen articles. The building height may remain low, and it will not be noticeably more difficult to effect the required periodical cleanings of the apparatus.

When operating the apparatus with a reasonably high speed it will hardly be realistic to use more than two portioning containers in each receiver station, but already thereby it is achievable to half the conveyor length, while also the number of diverter units may be reduced correspondingly. The length and the associated space requirements may be further reduced if double containers are arranged at both sides of the conveyor.

The more straight forward possibility of arranging for the required switchings between two containers is to mount the pair of containers in a cross displaceable manner relative to the conveyor belt, but as mentioned below this will imply certain problems. With the invention, however, there is provided for another and better solution, based on the already existing condition of the containers having to exhibit, in the length direction of the conveyor, a length which is somewhat bigger than corresponding to the expectable sizes of the articles; this is required because at each receiver station there will be some spread with respect to the place of delivery of the articles over the edge of the conveyor belt. Normally, the associated overlength of the containers will imply unnecessarily large container bottom areas, and in a preferred embodiment of the invention this is used to the effect that there is pivotally arranged, near a middle area of the bottom of a singular container, an upwardly projecting partition plate which divides the container in two container parts, but which, in being pivoted between the opposite sides, may nevertheless make both container parts appear with practically the same upper mouthing corresponding to the correctly placed mouthing of the singular container. The two container parts should not anyway receive articles at the same time, and a switch over of the partition plate can be effected very rapidly, such that the two container parts can be operative in immediate succession. Only they should be provided with individually openable bottoms.

The use of this pivotable plate may invoke an approach to the above mentioned problem with respect to undesired inlined walls, at least in one outer position of the plate. This possible problem will be accentuated by the desired low building height of the container, as the pivot plate should then be moved through a relatively large angle in order to be switched between the opposed mouthing edges of the container. However, it is an inherent possibility that the relevant inclined plate can be affected to swing up from the inclined position, even impactwise, such that an adhering article, if any, gets the opportunity to slide down or, respectively, is directly thrown off from the wall for fall-down into the dedicated container part.

The thus sectionized unitary containers may, therefore, appear with rather conventional outer dimensions, this also applying to the bottom, irrespectively of the bottom now appearing as two singular bottom portions. For the same reason the underlying outlet conveyor may be of an unchanged, conventional width, however without the invention being correspondingly restricted.

BRIEF DESCRIPTION OF THE DRAWINGS

In the following the invention is described in more detail with reference to the drawing, in which.

DETAILED DESCRIPTION OF THE INVENTION

Figure 1:
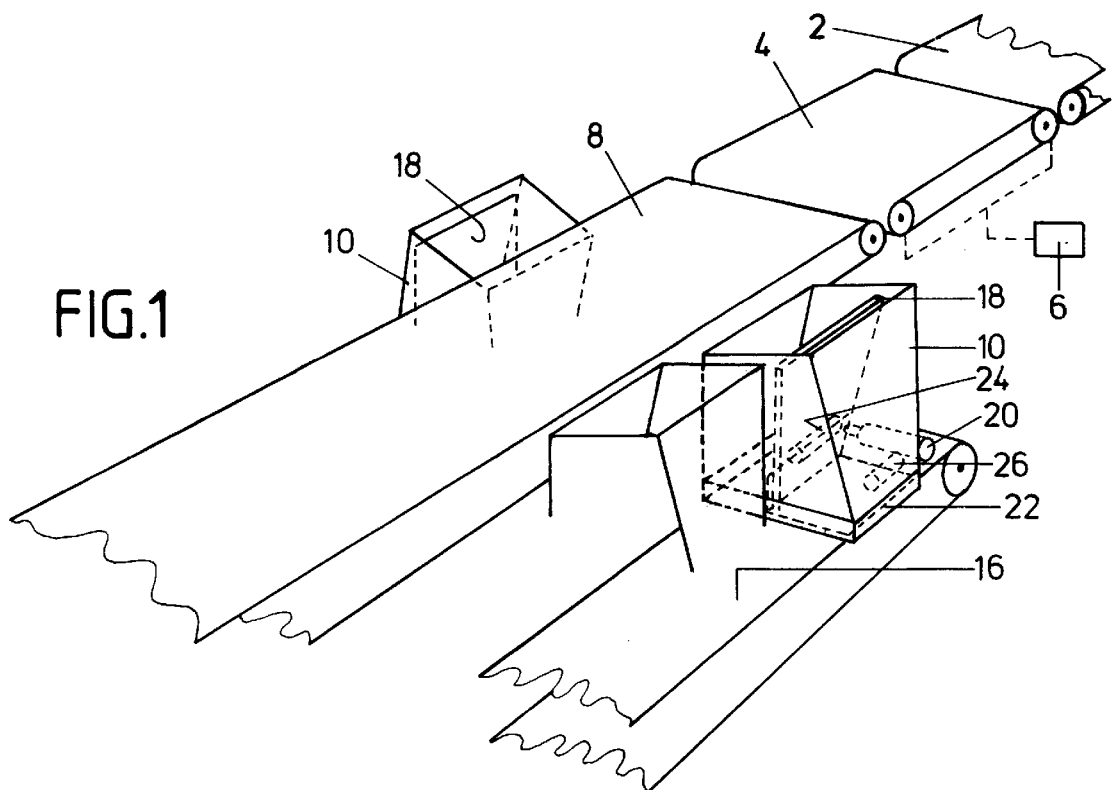
FIG. 1 is a perspective view of an apparatus according to the invention.
Figure 2:
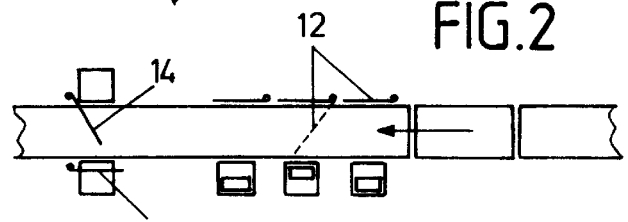
FIG. 2 is a top view thereof.

In its basic concept, the apparatus shown in FIG. 1 is a conventional grader, with a feeding belt 2, a weighing belt 4 connected with a memorising control computer 6, and a sorter belt 8, along which there is mounted, at one or both sides, a fixed row of receiver containers 10. Opposite these containers, as shown to the right in FIG. 2, there are provided diverter wings 12 which, controlled by the computer 6, are operable to be swung across the belt 8 such that articles, when weighed and moved further on this belt, can be selectively unloaded to the various containers, in which it is then possible to build up article portions according to selected criteria. To the left in FIG. 2 it is shown that instead of wings 12 to be swung towards the associated container it is possible to use wings 14 which are swung out from the respective containers; it is possible to hereby work with containers located opposite to each other, whereby the length of the belt 8 can be halved for a given number of containers.

Preferably, there is underneath each row of containers mounted a conveyor belt 16, FIG. 1, which may receive the finished portions as these are delivered from the containers, via computer controlled bottom valves therein.

So far described the system represents prior art.

Figures 3, 4, 5:
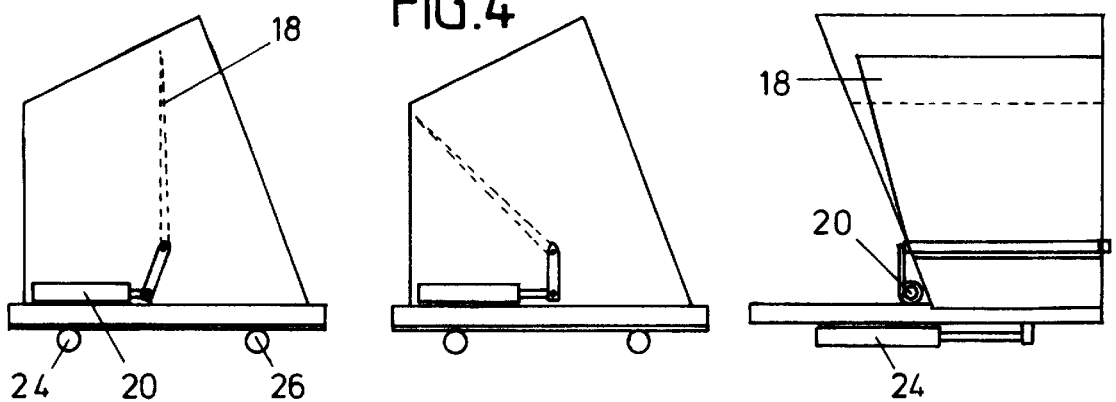
FIGS. 3 and 4 are end views of a receiver container in the apparatus.
FIG. 5 is a side view thereof.

According to the invention there is arranged in each container an upstanding partition plate 18 which, e.g. by means of a cylinder 20, can be swung towards and away from the adjacent side edge of the belt 8, confer the two positions shown in FIGS. 3 and 4, respectively. As indicated in FIG. 1, the bottom of the containers is designed with or as individually retractable bottom valve plates 22, which can be pushed in and out by means of individual cylinders 24 and 26 for opening and closing of the bottom of the respective compartments, in which the container is divided by the partition plate 18.

As the computer 6 is already in advance adapted to currently select a container 10 for reception of specific articles, such a selection may as well be related to each of the two container units here constituted by the two compartments of each container 10, all according to the position of the partition plate 18, and such a selection, therefore, may also comprise an actuation of the cylinders 20 for switching over the plates 18 for an operative formation of the respective receiver compartments. Correspondingly, the computer may provoke a selective opening of the bottom-valves 22 of the respective compartments, such that the final consequence is that the grader operates with twice the number of receiver containers relative to the factual, space occupying number thereof. Thus, the length of the belt 8 can be halved.

The innermost top edge of the containers 10 is located just outside and slightly beneath the associated side edge of the conveyor belt 8, while the outer rear wall of the containers projects further upwardly, in order to catch articles directly thrown off the belt 8. It will be noted from FIG. 3 that the pivot plate 18 in its upstanding position projects almost correspondingly, whereby it fulfills the same purpose for guiding articles to the innermost space portion of the containers.

In its inclined position shown in FIG. 4, the pivot plate 18 will be near such a small inclination that there may be a potential risk of received, sticky articles sticking to this plate. However, the control equipment is so adapted that the pivot plate 18, immediately upon an article having been delivered to the container, see FIG. 4, will be abruptly upwardly pivoted, such that a received article can easily slide or be thrown down to the outermost container section. The computer will then control the pivot plate 18 to remain upstanding or to pivot to the position of FIG. 4, as a prepartion for the reception of the next relevant article.

In principle, the pivot plate 18 may be arranged crosswise of the position shown, such that it is pivotable in the longitudinal direction of the belt.

Figure 6:
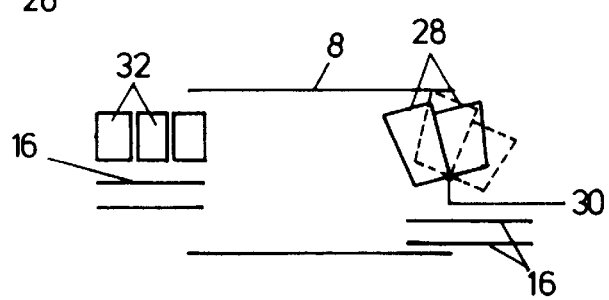
FIG. 6 is a schematic end view of a modified embodiment.

In the right hand side of FIG. 6 it is indicated that a possible alternative is to use two built-together containers 28 which, as a whole, may be tilted about a lower axis 30 for operative actuation of one container or the other. To the left in FIG. 6 it is correspondingly shown that at each container position along a side edge of the belt 8 there may be provided a cross displaceable row of containers 32 which, by any suitable means, may be displaced between different operative receiver positions relative to the side edge of the belt 8 and preferably a single delivery position, in which the valve bottom of a ready filled container section 32 is located above the outlet belt 16. Also here, in principle, the displacement could be effected in the longitudinal direction of the belt, but that would require extra space along the belt.

These last mentioned embodiments are subject to the limitation that the container sections should be able, partly, to be moved under the lower return run of the belt 8, but this may be acceptable if the return run is carried rather close to the upper conveyor run or if the objects are delivered from the conveyor so accurately that they can be received without assistance from the rear or particularly the foremost walls of the containers 10.

It should be mentioned that the supplied and handled "objects" may be constituted by portions of still smaller objects.

The invention also comprises the disclosed method of portioning out the supplied objects.

I claim:

1. A portioning system of the grader type, having an inlet for a flow of mutually separated objects, a station for detecting and registering a relevant quality of the objects, a control unit, a conveying line for further conveying the objects along a sorting out path with an associated series of receiver containers, diverter means for selectively unloading the objects, controlled by the control unit, for an accumulative building up of desired object portions in the receiver containers, actuation means controlled by the control unit for effecting outletting of finished portions from the receiver containers, and conveyor means for currently receiving and delivering the finished portions, characterized in that the receiver stations are of the type each comprising at least two receiver containers and having switching means for selective actuation of these containers for object reception, and that these switching means are constituted by means for moving the containers themselves or parts thereof for positioning a mouth opening of a selected container in the relevant position for direct reception of objects from the conveying line.

2. A system according to claim 1, in which a pair of the receiver containers in a receiver station are built together as a single container having at a middle bottom area, an upstanding, pivotally mounted pivot plate, which is shiftable between opposed outer positions, in which the upper container mouth communicates with either one or the other of the container sections at the respective opposite side of the pivot plate individually operable outlet means.

3. An apparatus according to claim 2, in which the pivot plate in at least one of its outer positions forms a downwardly inclined guiding face for received objects, the control unit being adapted so as to effect, after each object delivery to the container, a raising of the pivot plate.

4. An apparatus according to claim 1, wherein the each of the receiver stations comprises a plurality of receiver containers which are rigidly connected to each other, and which are displaceable together crosswise relative to the conveying line in a manner enabling the mouth opening of the receiver containers to be positioned at different receiving positions relative to the conveyor.

5. An apparatus according to claim 1, wherein the quality which is detected and registered is the weight of the objects.

6. An apparatus according to claim 1, wherein the container sections are provided with individually operable outlet means.

* * * * *